US006458394B1

(12) United States Patent
Talbott

(10) Patent No.: US 6,458,394 B1
(45) Date of Patent: Oct. 1, 2002

(54) PROCESS FOR THE UNIFORM COLORATION OF CHEESE

(75) Inventor: Larry L. Talbott, Park Falls, WI (US)

(73) Assignee: Rhodia Inc., Cranbury, NJ (US)

( * ) Notice: Subject to any disclaimer, the term of this patent is extended or adjusted under 35 U.S.C. 154(b) by 0 days.

(21) Appl. No.: 09/584,584

(22) Filed: May 31, 2000

Related U.S. Application Data

(63) Continuation-in-part of application No. 09/129,487, filed on Aug. 4, 1998, now abandoned.
(60) Provisional application No. 60/054,932, filed on Aug. 8, 1997.

(51) Int. Cl.⁷ .............................................. A23C 19/05
(52) U.S. Cl. ........................... 426/36; 426/40; 426/250; 426/582
(58) Field of Search ............................... 426/36, 40, 41, 426/262, 270, 540, 582, 583, 250

(56) References Cited

U.S. PATENT DOCUMENTS

| | | | |
|---|---|---|---|
| 4,380,553 A | 4/1983 | Schmidt ...................... | 416/250 |
| 4,699,664 A | 10/1987 | Hettiarachchy et al. ..... | 106/288 |
| 4,888,184 A | 12/1989 | Bottomley et al. ........... | 426/41 |
| 4,919,958 A | 4/1990 | Kadan et al. ................ | 426/573 |
| 5,053,240 A | 10/1991 | Todd, Jr. ..................... | 426/540 |
| 5,587,196 A | 12/1996 | Mehnert et al. ............ | 426/611 |
| 5,629,037 A | 5/1997 | Gaffney ....................... | 426/36 |

FOREIGN PATENT DOCUMENTS

| | | | |
|---|---|---|---|
| EP | 0188067 | 7/1986 | |
| FR | 1414723 | 1/1966 | |
| GB | 2248170 | 4/1992 | ............. A23L/1/27 |

OTHER PUBLICATIONS

Problems Encountered with the Colouring of Chesse by Means of "Water Soluble β–Carotene Preparations", S. Afr. J. Dairy Technol., vol. 5, No. 4, pp. 181–185, Luck, H., Apr. 1973.

"Colouring Cheese by Means of β–Carotene," S. Afr. J. Dairy Technol., vol. 4, No. 4, pp. 207–213, Luck, et al., Apr. 1972.

"Molke and Molveverwendung," VEB Fachbuchverlag, Leipzig, pp. 91–95 and pp. 107–109, Sienkiewicz T., XP–002085028, Jan. 1986.

*Primary Examiner*—Keith Hendricks
(74) *Attorney, Agent, or Firm*—Ohlandt, Greeley, Ruggiero and Perle

(57) ABSTRACT

An improved method for the uniform coloration of cheese comprises binding or associating a food grade water-soluble annatto colorant with a renaturable casein carrier which is then dispersed within the milk source that is processed into the final cheese product. The method comprises the improved partitioning of color between curd and whey resulting in whey with less or substantially no color contamination.

12 Claims, No Drawings

PROCESS FOR THE UNIFORM COLORATION OF CHEESE

RELATED APPLICATION

This application is a continuation-in-part of now-abandoned application Ser. No. 09/129,487, filed Aug. 4, 1998 and claims the benefit of the disclosure in U.S. Provisional Application Serial No. 60/054,932, filed Aug. 8, 1997.

BACKGROUND OF THE INVENTION

1. Field of the Invention

The present invention relates generally to the coloration of foods and in particular dairy foods such as cheese. Specifically, the invention relates to the substantially uniform and homogeneous incorporation of a food-approved natural water-soluble annatto colorant or dye by plating it onto a solid renaturable casein substrate component ordinarily present in cheese and uniformly partitioning the colored component throughout the cheese and resulting in a whey by-product with less, generally substantially no, color contamination.

2. Technology Description

Cheese production and manufacture is obviously centuries old and although there have been many variations and improvements developed in the process over the years, the basic method of production remains unchanged. Milk is fermented with a starter bacterial culture. Casein, as well as other milk proteins, coagulates and precipitates from solution over time. This enzyme action such as rennet (chymosin) further hydrolyzes the proteins, changing the milk from a liquid to a solid-in-a-liquid two-phase system. The solids fraction is known as the curds and after heating for further solidification, the curds are separated from the liquid (or whey) and processed in order to arrive at the final cheese product.

As a means to enhance the visual and aesthetic appeal of certain types of cheese, such as cheddar, government-approved food colors or dyes are added during the process in order to give the cheese the richer, mellowed appearance of darker yellow and orange hues. In particular, one colorant which is known in the art and exhibits superior rich tones and hues when incorporated in cheese to impart or suggest a robust, flavorful cheese is annatto. Annatto is a vegetable-derived colorant chemically known as ethyl bixin whose formula and composition is a fatty pigment which is a carotenoid derived from the buds of *Bixa orellana*.

During standard cheese manufacturing protocols, once the curd is fully precipitated from the aqueous fraction or whey, it is most desirable to separate the two completely. Under modern methodologies, whereas the curd is processed into the final cheese product, a purified aqueous whey can still be useful in other applications. Since colorants such as annatto are water-soluble, any attempt to incorporate them directly into the cheese by mixing them either into milk or into the curds and whey mixture as is presently done in commercial processes will yield less than optimal results since the colorant will remain solubilized and a portion will separate out and will be lost from the solid curds/cheese fraction into the aqueous whey. This has the twofold effect of delivering less annatto to the curds and potentially adding color impurities into the whey. The whey by-product resulting from cheese manufacture can be used in other food applications such as puddings, ice cream and processed cheese. In practice additional chemical processing steps such as the addition of oxidizers to bleach the by-product in order to render it more usable are typically required.

In the past, cheese color has been incorporated into natural cheeses by incorporating the annatto, in aqueous solution form, into milk which is then processed as defined above. It is believed that the annatto generally associates with the casein protein and using this as the vehicle is incorporated throughout the curds fraction and eventually throughout the final cheese product. For the production of processed cheese, color is provided through the use of either oil soluble colorants such as oil soluble annatto, which is added to the process cheese mix for incorporation into the oils used to form the processed cheese, or along with the use of pre-colored starting natural cheese (produced in accordance with the above conventional processing).

It would be advantageous then to devise a method in which the water-soluble annatto food colorant is incorporated directly onto or within the solid curd fraction. U.S. Pat. No. 4,699,664 to Hettiarachchy et al. discloses a method for the loading and stabilization of natural pigment complexes including ethyl bixin, i.e., annatto. The colorants allegedly have improved stability against oxygen, heat, light and moisture degradation and are formed into a complex comprising the pigment, a hydrocolloid such as pectin, gums and modified celluloses and a polyvalent metal cation connecting the two. The polyvalent cation is selected from the group consisting of the soluble salts of calcium, magnesium, zinc, copper and the like. The stabilized colorants can be incorporated into cheeses, beverages, processed foods and the like.

U.S. Pat. No. 5,053,240 to Todd discloses compositions comprising norbixin complexed with a substrate consisting of a water-soluble or water-dispersible protein or polysaccharide. Suitable proteins include milk protein, sodium caseinate, whey, gelatin and the like. Suitable polysaccharides include cyclodextrin, maltodextrin and food starch among others. The complexes are useful in coloring food products and beverages.

U.S. Pat. No. 4,380,553 to Schmidt teaches a method for imparting a reddish color to seasoning salts comprising the formation of a slurry of annatto in an alkaline solution, precipitating annatto with acid and plating precipitated colorant onto the salt crystals. The pigmented salt is allegedly useful in the flavoring of snack foods.

Another process for incorporation of colorant into cheese is disclosed in EP 188 067 A2. In this publication the applicant recognizes the problem that a water-soluble colorant such as Coomassie blue is partitioned into both the curd and whey portions of cheese. Those applicants suggest that if this water-soluble colorant is made into insoluble particles of equal to or greater than 0.20 microns it is possible to partition the colorant primarily into the curd portion so that none is visually detectable in the whey. To accomplish this the applicants stained insoluble acid curd particles of a size greater than 0.20 microns with the colorant and then added the insoluble, non-hydratable stained particles to fresh milk, after which natural curds are induced from the milk by the actions of acid so that the insoluble stained acid curd particles are entrapped within the newly forming natural curd. While this process of entrapping insoluble stained particles in curds of cheese can increase the amount of colorant to the curd as compared to the whey, there are significant drawbacks to such a process. While the stained insoluble particles are primarily entrapped in curd, the particles, being insoluble, are not uniformly distributed throughout the curd. Rather, individual colored insoluble particles are distributed in the newly formed curd and this can produce "hot spots" of coloring in the newly formed curd where stained insoluble particles have agglomerated during their entrapment. Furthermore, the newly formed curd itself is not colored per se; rather insoluble colorant particles are entrapped within the newly formed natural curd.

There is, therefore, still a need in the art for a method to substantially uniformly distribute water-soluble colorant into cheese and minimize or substantially eliminate color in whey by-product from the cheese making process. There is also a further need to provide a method for the substantially uniform distribution of water-soluble colorant into cheese without emptying entrapment of water-insoluble particles so as to be able to avoid the production of colorant hot spots in the resulting cheese.

SUMMARY OF THE INVENTION

In the process of this invention water-soluble annatto colorant is first placed in contact with a renaturable casein carrier (in the absence of whey) so that has the opportunity to become uniformly and homogeneously bonded with, such as by plating onto or complexing with, the renaturable casein carrier without becoming associated with whey. Since the annatto colorant first becomes bound with the renaturable casein carrier before it is added to the milk solution for making cheese, the water-soluble annatto colorant has already become complexed with the renaturable casein carrier before it becomes exposed to the milk and before it is exposed to the whey from the milk, and thereby avoids the opportunity to color the whey. The water-soluble annatto colorant is therefore able to be preferentially and substantially uniformly, homogeneously distributed in the curd portion with the renaturable casein carrier.

In accordance with one embodiment, the present invention comprises a process for providing substantially uniform homogeneous coloration to cheese during its manufacture comprising the steps of:

(a) first forming a renaturable coloring composition comprising a water-soluble annatto colorant bonded with a renaturable casein carrier;

(b) subsequently adding the renaturable coloring composition to the milk used to form cheese;

(c) processing the milk to separate it into a curd portion and a whey portion wherein color is provided to the curd portion as a result of the renaturable casein carrier having an affinity to the curd portion as compared to the whey portion;

(d) separating the curd portion from the whey portion; and (e) converting the curd portion into cheese.

The renaturable casein carrier comprises casein, a casein salt or acid precipitated casein which is renaturable.

It is an object of the present invention then, to provide an improved method for the partition of a water-soluble annatto colorant in the preparation and manufacture of cheese. In particular, it is an object of the invention to first associate a food approved annatto colorant uniformly with a renaturable casein substrate ordinarily present in cheese that can be thereafter, in renaturated form, incorporated within a milk source which is then further processed to provide cheese having improved, substantially uniform, homogeneous coloration and provide a whey by-product that has less and substantially no color contamination.

It is yet another object of the present invention to produce a whey by-product from cheese manufacture having minimal or reduced color impurities and which can be better used in the production of formulated food products.

A further object of the present invention is to provide a method for adding a water-soluble annatto colorant during cheese manufacture without adding the colorant itself in an aqueous slurry during the manufacturing process and thereby not require the addition of unnecessary water.

These, and other objects, will readily be apparent to those skilled in the art as reference is made to the detailed description of the preferred embodiment.

DETAILED DESCRIPTION OF THE INVENTION

In describing the preferred embodiment, certain terminology will be utilized for the sake of clarity. Such terminology is intended to encompass the recited embodiment, as well as all technical equivalents which operate in a similar manner for a similar purpose to achieve a similar result.

The present invention is directed to a novel method for the substantially uniform and homogeneous coloration of cheese and other dairy products in which a food grade water-soluble annatto colorant or dye is bound, i.e. plated or otherwise associated or complexed with a solid renaturable casein substrate that is a natural component of the cheese product itself. The annatto colorant is bound with the renaturable casein support which has an affinity towards the curd portion of the curd and whey mixture using means known in the art such as a fluidized bed apparatus or by co-drying the colorant with the solid renaturable casein support and is thereafter added, in renaturable form, to the milk used during the cheese manufacturing process. Because the casein support is renaturable, is hydrateable and has an affinity towards the curd, during cheese manufacture the casein support, and associated water-soluble annatto colorant is substantially uniformly and homogeneously distributed to the curd portion of the cheese in a nearly quantitative amount. By using the renaturable affinity support, little, if any, of the water-soluble colorant is distributed in the whey fraction which whey fraction then can be better used in other applications. Accordingly, a twofold benefit of obtaining a cheese product having improved, substantially uniform and homogeneous coloration and recovering as a by-product of the process whey having little to no color impurities is achieved.

Milk used in the fermentation and manufacture of cheese is largely comprised of water (87%), milk proteins such as casein (3.0%), fat and fatty acids (3.8%), lactose (5.0%), minor amount of serum proteins and inorganic minerals such as calcium, potassium, phosphorous, ion, magnesium, etc. Milk is actually an emulsion of all these elements, which exhibit several levels of dispersion. In accordance with the present invention, either whole milk, reduced fat milk or nonfat milk may be used in the cheese manufacture.

Although commonly regarded as the major protein component of milk, casein is actually a colloidal aggregate of several different and identifiable proteins complexed together with phosphorous and calcium. It is insoluble in water, and precipitates upon action of a coagulant.

In the preparation of cheese in general, a starter bacterial culture and coagulant is added to milk to produce a solid and liquid phase which phases are easily separable. The solid phase is primarily comprised of casein and fat. The liquid phase is comprised of water, whey protein, lactose and minerals. The two phases are then separated and the solid, predominantly casein rich curds are further processed as cheese while the liquid phase or whey may be used in other applications.

It is important to solidify and gel as much of the casein-rich curds as possible to improve conversion of the milk to the final cheese product. In addition, it is desirable to produce as a by-product a less colored or more purified liquid whey fraction which fraction can thereafter be used in other applications.

In order to provide color to the cheese using standard cheese making procedures, in accordance with the present invention, the water-soluble annatto colorant is first associated with a solid renaturable casein support so that the water-soluble annatto is firmly incorporated therein and then is subsequently incorporated into milk. The milk is then processed to form the final cheese product as is known in the art.

In order to utilize the preferred affinity plating method of the present invention, it is necessary to first associate the water-soluble annatto colorant with the renaturable casein carrier material. The renaturable casein carrier material selected is typically a casein material, preferably a solid, which is otherwise already present in the cheese making process and particularly characterized by being capable of preferentially associating with the curd portion of the cheese once separation of the milk into the curd portion and the whey portion occurs. The preferred renaturable casein carrier material comprises casein (including salts such as sodium, potassium or calcium caseinate or renaturable acid precipitated casein).

The colorant is associated with the renaturable casein solid carrier material using means known in the art, such as by utilizing a fluidized bed reactor apparatus. When using a fluidized bed apparatus, the renaturable, solid casein carrier particles are suspended in an air or other inert gas flow in the reactor chamber during which time a liquid solution of the water-soluble annatto colorant is injected into the gas flow as well. The fluidized carrier comes into intimate contact with the surrounding colorant solution which immediately bonds thereto. Once dried, the particles are collected, and incorporated into milk which milk is then processed as cheese as follows.

Other methods for associating the water-soluble annatto colorant with the renaturable casein carrier include, but are not limited to, spray coating, pan coating, solvent film coating, co-spray drying of the colorant and the carrier, and the like.

In practice, when using a water soluble annatto solution to plate the annatto onto the renaturable casein carrier material, the solution used is typically between about 1 to 5 weight percent by weight solid annatto, and 99 to 95 weight percent water, the total amount being 100 weight percent.

In preferred embodiments, the solution comprises a 3.2 weight percent aqueous solution of annatto.

The amount of color to be plated onto the carrier and incorporated into the cheese will vary and depends upon the type of cheese desired as the final product. In practice, this amounts to adding between about 0.01 to about 5.0 ounces of colorant solution per pound of carrier. In a preferred embodiment where the colorant solution comprises a 3.2 weight percent solution of annatto, between about 0.125 to about 5.0 ounces of the annatto solution is added to one pound of carrier. For example, if the final cheese product is a cheddar variety, a higher concentration of annatto solution is added to the carrier particles during the fluidized bed deposition (or other association) process. If the final cheese product is to be light in color or a mozzarella type, a much lower concentration of annatto solution is added, if at all, to the carrier particles.

In preparing the cheese as is known in the art, for example, cheddar cheese, pasteurized milk is heated in a cheese vat to a temperature of from about 85 to 95° F. and preferably from about 88 F. to 95° F. Bacterial cheese cultures are added to the vat when the system reaches the desired temperature. The colorant/carrier particles are then added along with any other flavor or texturing agents. In practice, the water-soluble annatto colorant/renaturable casein carrier particles are added either (1) in dry form and hydrated and renatured in the milk, water or milk/water mixture, or (2) in an aqueous or milk or aqueous/milk slurry so that the amount of colorant/carrier particles are added (by dry weight) in an amount of between about 0.01 to about 1.0 parts per 1000 parts of milk to be processed, and more preferably about 1.0 part per 1000 parts of milk. As is considered standard for cheese making, calcium solutions are added in order to aid in the coagulation and solidification of the product by rennin.

In a specific embodiment of the present invention, the colorant may be added to the milk in a dry form (i.e., the protein carrier particles act as a diluent for the colorant). This has the benefit of reducing the amount of water added during the cheese manufacture, hence potentially reducing raw material, storage, recycling and disposal costs. These cost reductions are obtained even if the improvement in color plating efficiency is minimal.

Once the coagulants are added, stirring of the vat is stopped and the cheese is permitted to coagulate quiescently. The coagulated curd is cut into small pieces and cooked while stirring for a period of from about 30 minutes to an hour. Cutting and cooking of the curd facilitates expulsion of the whey therefrom. Because of the affinity of the carrier to the curd portion of the curd/whey system, enhanced color is provided to the curd and is not transferred to the whey.

The whey by-product, which should contain reduced color impurities, can then be recovered by means known in the art such as separation, and subsequently condensed, dried, etc.

The advantage of incorporating water-soluble annatto color into cheese in this manner is that it allows for the production of a substantially uniformly, homogeneously colored cheese while partitioning the color essentially exclusively in a uniform manner towards the curd and reducing or essentially eliminating residual color in the whey. Secondly, it allows for the preparation of a highly purified whey by-product which is then more useful in a variety of other applications. Under present commercial manufacturing procedures, the whey by-product can contain amounts of colorant which colorant must be removed if a pure by-product is desired. Chemical treatment, such as the addition of oxidizing agents is typically used. By using the color partitioning method of the present invention, this chemical treatment step may be omitted, resulting in significant cost savings to the cheese manufacturer. In addition, whey by-product is commonly used in the manufacture of ice cream, puddings, and processed cheese. The presence of color impurities in the whey used in such products can result in an inferior, potentially non-salable product. The whey by-product produced by the present invention has reduced or substantially no color impurities and can therefore be readily used in such products "as is". In addition, if the colorant/carrier is directly added to the milk in dry form, processing costs otherwise associated with the addition of water during the process may be reduced.

COMPARATIVE EXAMPLE 1

To provide color to milk used to prepare cheese, liquid annatto (norbixin) is added directly to the cheese milk.

0.0316 grams (the equivalent of 1.0 ounce/1,000 lb.) of single strength annatto is added directly to the cheese milk.

Example 2

15.00 parts of renaturable calcium caseinate and 00.9384 parts of cheese color single strength annatto are slurried in 84.06 parts of water to associate (complex) the annatto with the renaturable casein carrier. 3.33 grams of this colored slurry, which is equivalent to 0.0324 grams of single strength cheese color is subsequently added directly to the cheese milk.

Quantative Testing

The cheese milk of Comparative Example 1 and Example 2 is color evaluated by reflectance using a Hunter Colorimeter. The variables "L", "a", "b" and "Hue Angle" are reflectance values used to determine the intensity of color in the sample.

| Experimental Milk Variables | L | a | b | Hue Angle |
| --- | --- | --- | --- | --- |
| Comparative Example 1 | 84.88 | 1.24 | 15.86 | 85.53 |
| Example 2 | 84.69 | 1.14 | 15.40 | 85.77 |

This data indicates that the cheese milk prepared in advance of the cheesemaking process is nearly identical in color for both Comparative Example 1 and Example 2.

To produce cheese from the above cheese milk samples, the milk, containing cheddar starter media, is tempered to 31–32° C. The milk coagulant (cloned rennet) is added at the rate of 1.15 oz./1,000 lb. of milk. The mixture is allowed to set quiescently for approximately 45 minutes until an appropriate firmed gel is achieved. The gel is cut, healed for 15 minutes and ramped in temperature to 38° C. within 30 minutes. Once this is accomplished the curd and whey portions are separated for reflectance evaluation. The table below lists the "L", "a", "b" and "Hue Angle" variables as obtained from a Hunter Colorimeter by evaluation of the whey portion. It is assumed that if the whey portion has a greater degree of color then less color has been transferred to the curd. Accordingly, the sample with the least amount of color in the whey portion is considered to be the most superior from the perspective of color partitioning.

| Experimental Whey Variables | L | a | b | Hue Angle |
| --- | --- | --- | --- | --- |
| Comparative Example 1 | 57.58 | −3.38 | 9.68 | 109.25 |
| Example 2 | 54.29 | −3.72 | 7.59 | 116.11 |

The reflectance from the whey produced from the above cheese vats show an "a" value being redder for the Comparative Example 1 sample as compared to the lesser red quantified for the Example 2 sample. The whey which shows the reddest numerical hue angle is the Comparative Example 1 sample as compared to the Example 2 sample. The above data therefore suggests that improved color partitioning is obtained using the Example 2 cheese colorant as compared to the Example 1 colorant.

Having described the invention in detail and by reference to the preferred embodiments thereof, it will be apparent that modifications and variations are possible without departing from the scope of the appended claims.

What is claimed is:

1. A process for providing substantially uniform, homogeneous coloration to cheese during its manufacture comprising the steps of:
    (a) forming a renaturable coloring composition comprising a water-soluble annatto colorant bound with a renaturable casein carrier;
    (b) subsequently adding the renaturable coloring composition to the milk used to form cheese;
    (c) processing the milk to separate it into a curd portion and a whey portion wherein color is provided to the curd portion as a result of the renaturable casein carrier having an affinity to the curd portion as compared to the whey portion;
    (d) separating the curd portion from the whey portion; and
    (e) converting the curd portion into cheese,
such that the resulting colored cheese has improved color compared to a similarly prepared cheese but wherein insolubilized annatto colorant is added to the milk without first being bound with renaturable casein carrier.

2. The process according to claim 1 wherein said water-soluble annatto colorant is plated onto the surface of the renaturable casein carrier.

3. The process according to claim 1 wherein said renaturable casein carrier is a solid and is selected from the group consisting of renaturable casein, casein salt, and acid precipitated casein.

4. The process according to claim 1 wherein said renaturable casein carrier comprises a caseinate salt.

5. The process according to claim 1 wherein said water-soluble annatto colorant is bound with said renaturable casein carrier by means of fluidized bed drying, spray coating, pan coating, co-spray drying of the water-soluble annatto colorant and the casein carrier or solvent film coating.

6. The process according to claim 5 wherein said water-soluble annatto colorant is bound with said carrier by means of fluidized bed drying.

7. Natural cheese having substantially uniform and homogeneous color produced by the process comprising the steps of:
    (a) forming a renaturable coloring composition comprising a water-soluble annatto colorant bound with a renaturable casein carrier;
    (b) subsequently adding the renaturable coloring composition to the milk used to form cheese;
    (c) processing the milk to separate it into a curd portion and a whey portion wherein color is provided to the curd portion as a result of the renaturable casein carrier having an affinity to the curd portion as compared to the whey portion;
    (d) separating the curd portion from the whey portion; and
    (e) converting the curd portion into cheese,
such that the resulting colored cheese has improved color compared to a similarly prepared cheese but wherein insolubilized annatto colorant is added to the milk without first being bound with renaturable casein carrier.

8. The cheese according to claim 7 wherein said renaturable casein carrier comprises a caseinate salt.

9. A process for producing whey having minimal color impurities comprising the steps of:
    (a) forming a renaturable coloring composition comprising a water-soluble annatto colorant bound with a renaturable casein carrier;
    (b) subsequently adding the renaturable coloring composition to milk used to form cheese;
    (c) processing the milk to separate it into a curd portion and a whey portion wherein color is provided to the curd portion as a result of the carrier having an affinity to the curd portion as compared to the whey portion; and (d) separating and recovering the whey portion from the curd portion, such that the resulting recovered whey portion has less coloration compared to a similarly recovered whey portion during the manufacture of cheese but wherein wherein the water-soluble annatto colorant is added directly to the milk without first being bound with renaturable casein carrier.

10. The process according to claim 9 wherein said renaturable casein carrier is selected from the group consisting of renaturable casein, acid precipitated casein or caseinate salt.

11. In a process for providing color during cheese manufacture, the improvement comprising the steps of producing a renaturable coloring composition by binding a water-soluble annatto colorant with a renaturable casein carrier and adding said renaturable coloring composition to the milk source used to produce the cheese, such that the resulting colored cheese has improved color compared to a similarly prepared cheese but wherein insolubilized annatto colorant is added to the milk without first being bound with renaturable casein carrier.

12. The process according to claim 11 wherein the renaturable casein carrier is selected from the group consisting of renaturable casein, acid precipitated casein and caseinate salt.

* * * * *